(12) United States Patent
Knight

(10) Patent No.: US 9,254,418 B2
(45) Date of Patent: Feb. 9, 2016

(54) HANGER

(71) Applicant: Steven R. Knight, Centennial, CO (US)

(72) Inventor: Steven R. Knight, Centennial, CO (US)

( * ) Notice: Subject to any disclaimer, the term of this patent is extended or adjusted under 35 U.S.C. 154(b) by 0 days.

(21) Appl. No.: 14/682,691

(22) Filed: Apr. 9, 2015

(65) Prior Publication Data

US 2015/0209619 A1    Jul. 30, 2015

Related U.S. Application Data

(62) Division of application No. 13/840,464, filed on Mar. 15, 2013.

(60) Provisional application No. 61/638,027, filed on Apr. 25, 2012.

(51) Int. Cl.
| F16M 13/04 | (2006.01) |
|---|---|
| A63B 29/02 | (2006.01) |
| F16M 13/02 | (2006.01) |
| A63B 71/00 | (2006.01) |

(52) U.S. Cl.
CPC ............... *A63B 29/024* (2013.01); *A63B 29/02* (2013.01); *A63B 71/0036* (2013.01); *F16M 13/02* (2013.01); *F16M 13/04* (2013.01)

(58) Field of Classification Search
CPC ................................ A63B 29/02; F16M 13/04
USPC ................................ 224/255; 248/302, 205.1
See application file for complete search history.

(56) References Cited

U.S. PATENT DOCUMENTS

| 451,182 | A | 4/1891 | Gaillac |
|---|---|---|---|
| 1,270,811 | A | 7/1918 | Garant |
| 1,404,436 | A | 1/1922 | Giroux |
| 3,563,430 | A | 2/1971 | Forrest |
| 4,112,541 | A | 9/1978 | Tetradis |
| 4,438,874 | A | 3/1984 | Zuckerman et al. |
| D296,846 | S | 7/1988 | Kawalek |
| 5,048,785 | A | 9/1991 | Shaw et al. |
| 5,416,955 | A | 5/1995 | Katsma |
| 5,458,301 | A | 10/1995 | Cournoyer |
| 5,511,705 | A | 4/1996 | Dreszer |
| 6,006,928 | A | 12/1999 | Parker |
| 6,338,463 | B1 | 1/2002 | Babitz et al. |
| 6,904,647 | B2 | 6/2005 | Byers, Jr. |
| 6,953,175 | B1 | 10/2005 | Carrera |
| 6,988,694 | B2 | 1/2006 | Barrs et al. |
| 7,036,780 | B1 | 5/2006 | Geninatti |
| 7,140,585 | B2 | 11/2006 | Wakuta |
| 7,228,601 | B2 | 6/2007 | Thompson |
| D548,073 | S | 8/2007 | Peaslee |
| 7,628,302 | B2 | 12/2009 | Yau |
| 2002/0148093 | A1 | 10/2002 | AmRhein |
| 2009/0032559 | A1 | 2/2009 | Fragale |
| 2011/0049203 | A1 | 3/2011 | Stark |
| 2011/0253759 | A1 | 10/2011 | Scalese et al. |

*Primary Examiner* — Brian D Nash

(74) *Attorney, Agent, or Firm* — Polson Intellectual Property Law, PC; Margaret Polson

(57) ABSTRACT

A storage and retrieval apparatus for objects with looped openings, the apparatus being flexible and made of metal, the apparatus characterized in having first and second arms, the first and second arms each having an upper end and each having a lower end, the apparatus having a body with first and second ends, the first end of the body connecting with the lower end of the first arm, the second end of the body connecting with the lower end of the second arm, the body having a shape, the shape of the body urging the first and second arms toward each other with a first spacing therebetween, the upper end of the first arm defining a first tip, the upper end of the second arm defining a second tip, the first tip and the second tip forming a space wider than the first spacing.

5 Claims, 4 Drawing Sheets

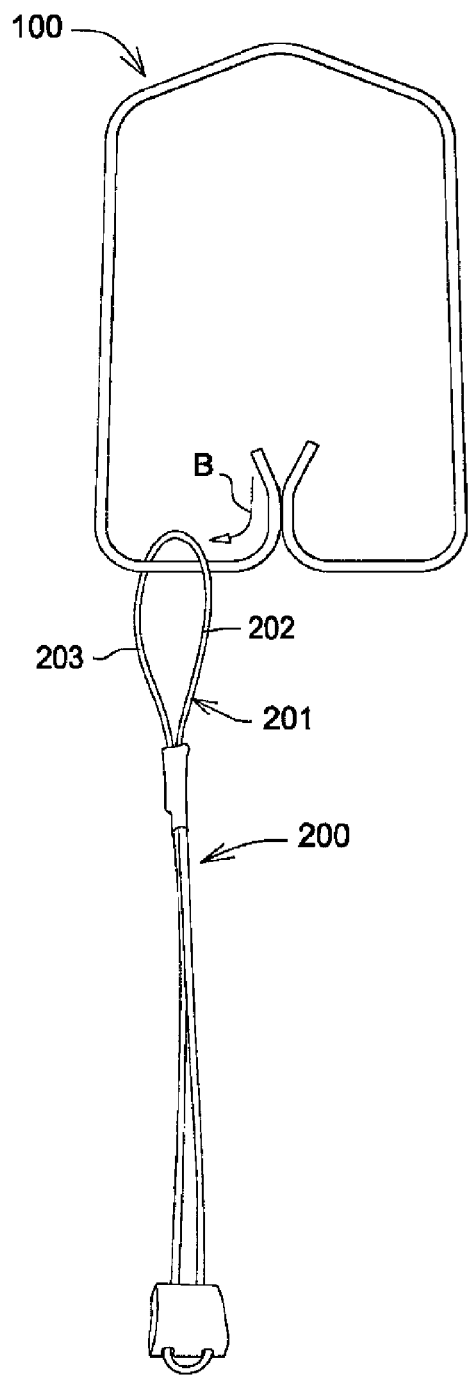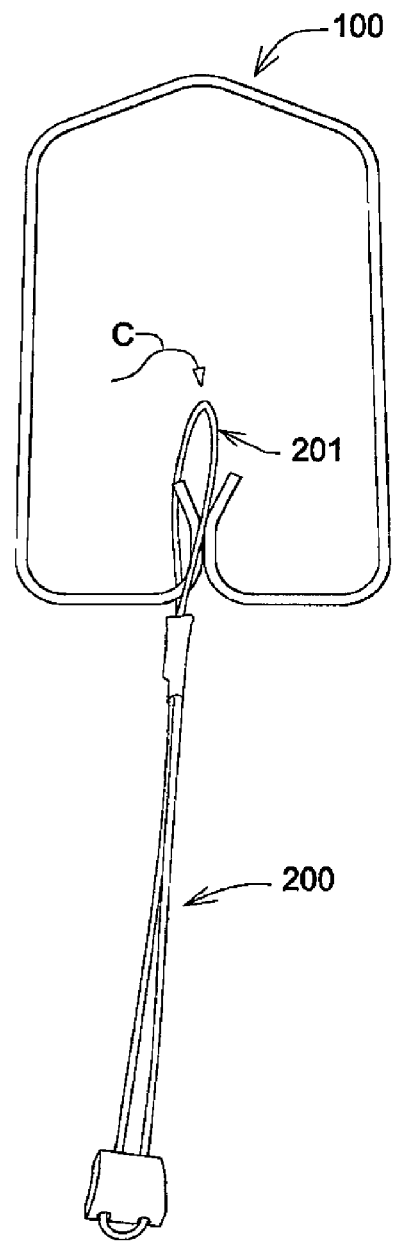
FIG.3
FIG.4

HANGER

BACKGROUND

There are many devices that need to be stored in groups that are either formed as closed loops and/or have closed loops attached to them for convenience of attaching to a desired object or holder. With many of these types of items a number different sizes are needed for different tasks, so it is desirable to store a number of different sized ones together. Carabiners are one example of an item that is often used to clip these types of items together.

One example of this type of object is chocks for rock climbing. A rock climber needs to have a large number of them with her when climbing, as a number of different sizes must be carried to allow for the different sizes of cracks in rocks. Further, the user often either wants to or has to use only one hand to get the object off the Carabiner or other storage device. It is often difficult to select the chosen chock, move it to the gate of the Carabiner, open the gate of the Carabiner, and then get the chock, and only that chock, out of the Carabiner. It is also often difficult to get a chock back on the Carabiner with only one hand. Further complicating this is that it is often desirable to not have objects swinging out away from the users body for a safety reasons. What is needed is a hanger that would allow a user to easily remove a chosen chock from the hanger and/or place an unneeded one back on the hanger with one hand.

The foregoing example of the related art and limitations related therewith are intended to be illustrative and not exclusive. Other limitations of the related art will become apparent to those of skill in the art upon a reading of the specification and a study of the drawings.

SUMMARY

One aspect of the present disclose is a hanger that holds a given number of devices with a closed loop on at least one end where the devices can be either loaded on to or removed from the hanger with a single downward/outward motion.

The following embodiments and aspects thereof are described and illustrated in conjunction with systems, tools and methods which are meant to be exemplary and illustrative, not limiting in scope. In various embodiments, one or more of the above described problems have been reduced or eliminated, while other embodiments are directed to other improvements.

A generally rectangular wire hanger is disclosed with a loading/unloading area. The gate is formed by the two ends of the wire being bent into a generally C shape and pressed together. The loading/unloading area is formed such that the devices can be loaded or unloaded with a single downward/outward motion.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 3 is a plan view of the climbing chock after being loaded.

FIG. 4 is a plan view of the start of the process of removing a climbing chock being removed.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION

Figure 1:
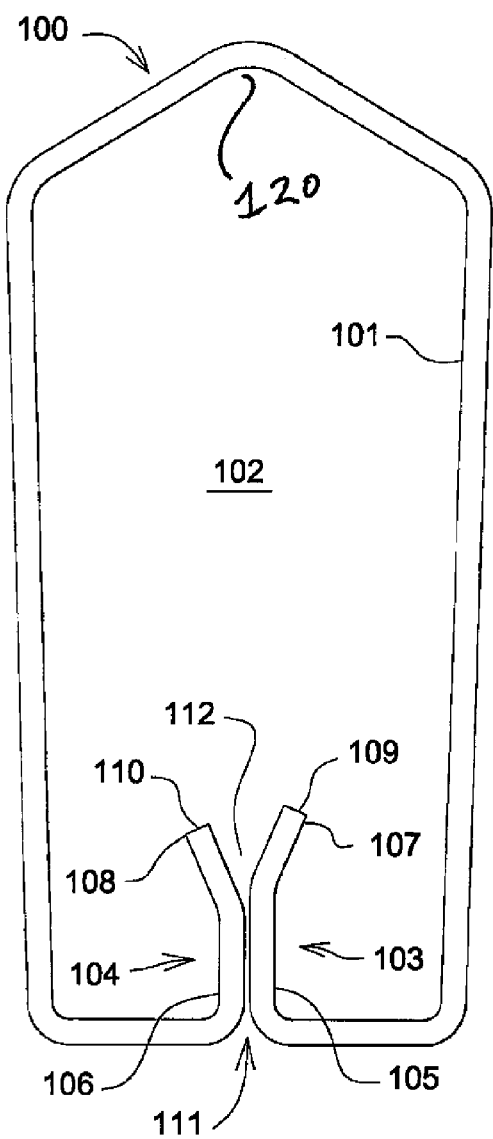
FIG. 1 is a plan view of the hanger alone.
Figure 7:
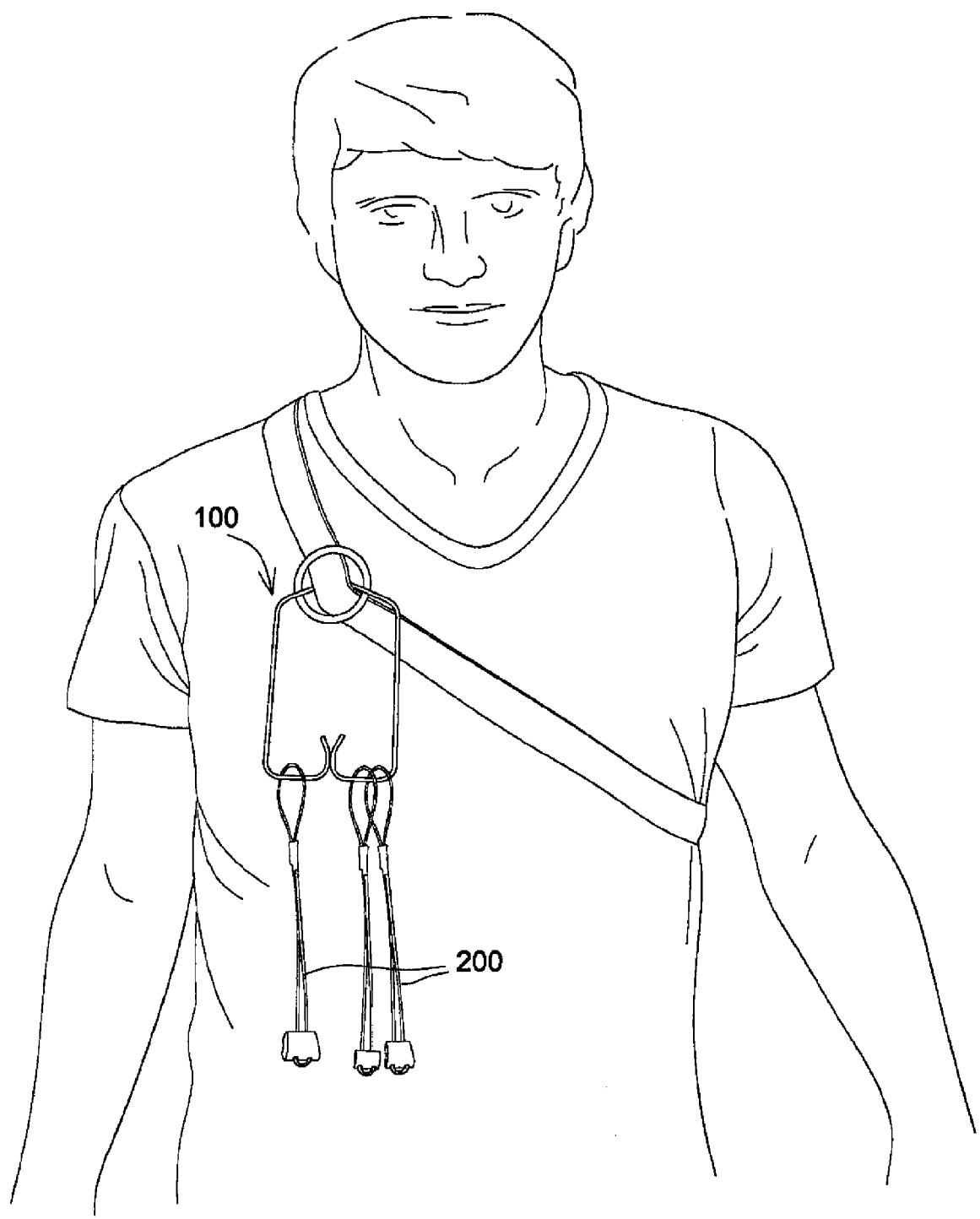
FIG. 7 shows the hanger on a strap.

In the discussion of loading items onto the disclosed hanger below, a climbing chock is used as an example. No limitation of the type of items that can be loaded on to the hanger is intended, or should be inferred. Further, all use the terms up, down, upright, or sideways are speaking in relation to the hanger as oriented in the drawings. The hanger could be used in any of a wide range of orientations and no limitation is intended or should be inferred by the use of those terms. FIG. 1 is a plan view of the hanger 100. The hanger 100 has a body 101 that encloses an open area 102. In the depicted embodiment the body 101 is a pentagram. The upper bend 120 helps center the hanger 100 on a strap which is slung diagonally across the climber's body when worn, shown in FIG. 7. Many other shapes are possible; no limitation is intended or inferred.

The ends of the wire are bent to two opposing arms 103, 104, which are generally C shaped in the depicted embodiment and extend into the open area 102. Other shaped are possible and no limitation should be inferred from the term C shaped. The arms 103, 104 have substantially parallel upright sections, 105, 106 which are pressed together. It is important for most embodiments that the upright sections 105, 106 are pressed together. The body 101 is formed of steel wire in the depicted embodiment. In the depicted embodiment the body 101 is made from spring steel or stainless steel so that the two upright sections 105, 106 are biased together such that they will spring back into position, as discussed below. Another possibility is that the wire is tempered after it is bent to gain a springy nature. Other materials and gauges could be used depending on the desired size and the weight and number of objects to be held.

In the depicted embodiment the upright sections 105, 106, are the center sections of the C. Above the upright sections 105, 106 are curved sections 107, 108 which bend away from each other, which each have tips 109, 110. Due to the curved sections 107, 108 there is a space 112 between the tips 109, 110. These C shaped sections together from loading area 111. It is generally preferred that the arms are approximately the same shape and size. One arm could be straight and one bent (not shown), but the device works much better with both arms bent, as the downward pull force is equal on both when they are the same.

Figure 2:
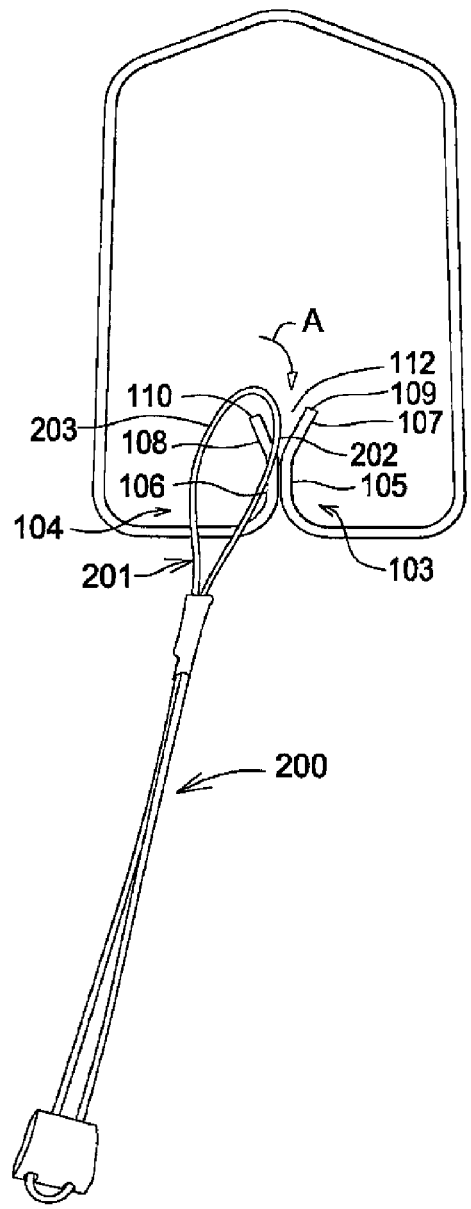
FIG. 2 is a plan view of a climbing chock in the start of being loaded on the hanger.

Referring next to FIG. 2, climbing chock 200 has a closed loop 201 on one end. In the depicted embodiment, a semi-rigid closed loop is shown. Having the closed loop makes the device easier to use, but is not required. To load a climbing chock onto hanger 100, loop 201 is placed over one tip, in the depicted embodiment it is tip 110, either tip would work, no limitation should be inferred as to the tip used. This places one side 202 of closed loop 201 over the tip 110 and resting in space 112 and leaves the other side 203 on the other side of tip 110 from the open space. The climbing chock 200 is then pulled down/outward as shown by arrow A, pulling the loop 201 between the upright sections 105 and 106, forcing the wires apart. As mentioned above, the upright sections 105, 106 are pressed together with some resistance, such that at least some force is required to pull the loop 201 through the uprights and the uprights 105, 106 spring back together after the loop 201 is pulled through. The amount of force required and/or desired will depend on a number of factors, including the wire chosen for the body, the size and weight of the objects to be stored on the hanger and other design considerations. The pulling motion is continued, as shown by arrow B in FIG. 3. This results in the closed loop being around the body 101 of the hanger 100, leaving it hanging on the hanger and retained thereon.

To removed a climbing chock 200 from the hanger 100, the closed loop 201 is moved over the loading area 111 in the direction of arrow C, as shown in FIG. 4. The chock 200 is then pulled downward/outward in the direction of arrow D in FIG. 5. This pulls the closed loop 201 between curved sections 107, 108 and then between the upright sections 105, 106.

Figures 5, 6:
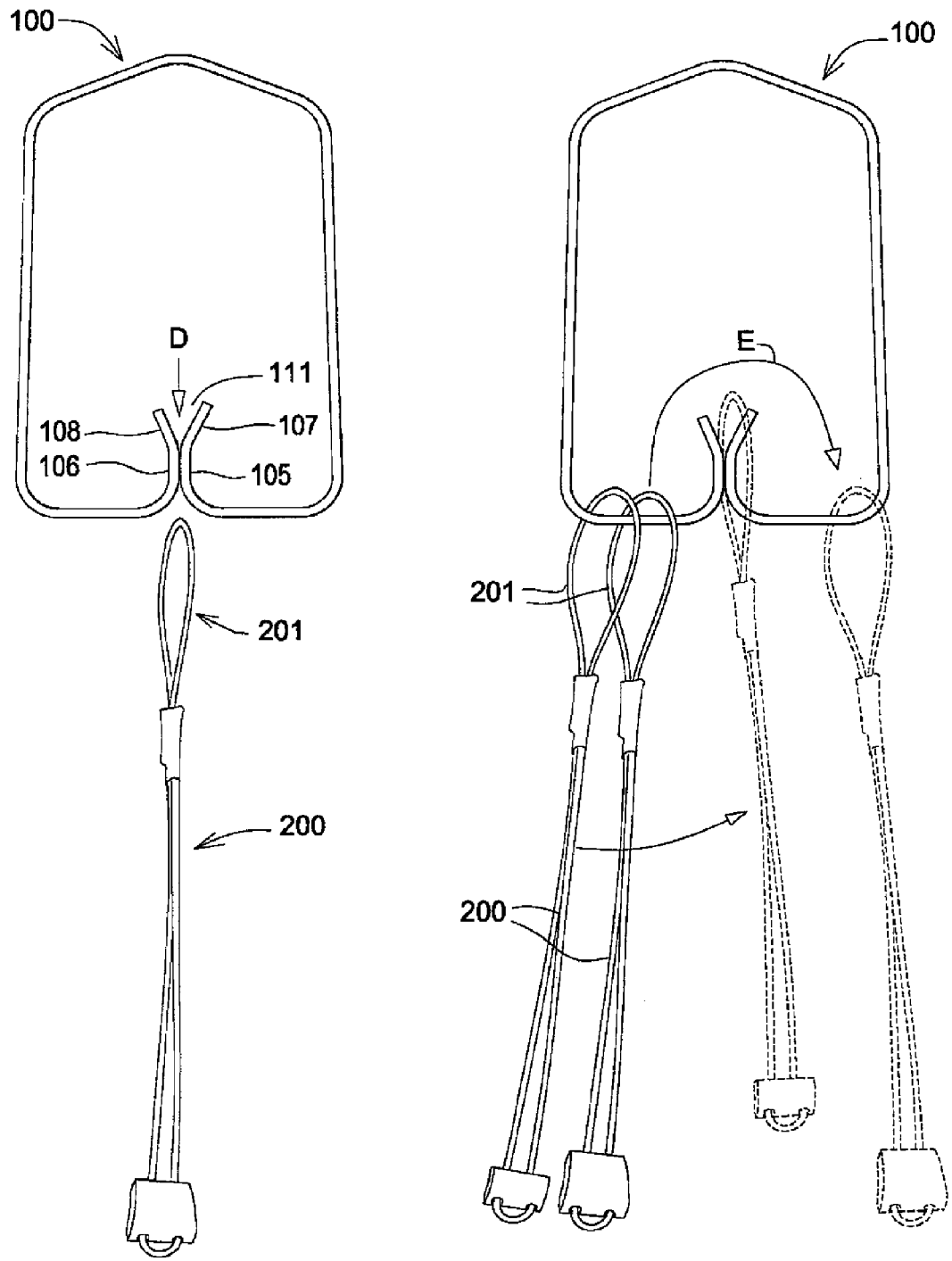
FIG. 5 is a plan view of the chock after being removed from the hanger.
FIG. 6 is a plan view of chocks being moved around on the hanger to allow a chosen chock to be removed.

If the chock or other device the user wishes to remove is not next to the loading area 111, a user can simply move the other chock to the other side of the loading area, as shown by arrow E in FIG. 6. This was any chosen chock or other device can be removed without having to remove any of the other chocks from the hanger and using only one hand.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and subcombinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

All patents and publications mentioned in the specification are indicative of the levels of skill of those skilled in the art to which the invention pertains. All references cited herein are hereby incorporated by reference to the extent that there is no inconsistency with the disclosure of this specification. Some references provided herein are incorporated by reference herein to provide details concerning additional starting materials, additional methods of synthesis, additional methods of analysis and additional uses of the invention.

I claim:

1. A method for attaching and removing objects with looped openings to a storage and retrieval apparatus, the apparatus being flexible and made of metal, the apparatus comprising first and second arms, the first and second arms each having an upper end and each having a lower end, the apparatus having a body with first and second ends, the first end of the body connecting with the lower end of the first arm, the second end of the body connecting with the lower end of the second arm, the body having a shape, the shape of the body having an outer periphery, the shape of the body urging the first and second arms toward each other with a first spacing therebetween, the upper end of the first arm defining a first tip, the upper end of the second arm defining a second tip, the first tip and the second tip forming a space wider than the first spacing; the method for attaching and removing an object with a looped opening comprising the steps of;

placing a looped end of an object with a looped end so that its loop is above the space and encircling one of the first or second tip;

pulling the first object with a looped end downward between the first and second arms in a first direction, thereby attaching the looped end to the storage and retrieval apparatus; and placing a looped end of the an object with a looped end that is attached to the storage and retrieval apparatus over the space and pulling down in the first direction, pulling the looped end between the first and second arms in the first direction, thereby removing the object from the storage and retrieval device.

2. The method of claim 1, further comprising the step, carried out prior to the steps of claim 1, of slinging a strap diagonally across a user's body, the strap connected with the apparatus, whereby the apparatus is suspended from the user's body.

3. The method of claim 1, wherein a second object with a looped end is attached to the apparatus to the left of the first arm by a loop thereof, the loop of the second object lying between the loop of the first object with a looped end and the first arm, the method further comprising the step, prior to the third step of claim 1, of lifting a second object with a looped so that its loop is above the space, and moving the second object with a looped end to a position to the right of the second arm.

4. The method of claim 3, wherein a third object with a looped end is linked to the apparatus to the left of the first arm by a loop thereof, the loop of a third object with a looped end lying between a loop of the second object with a looped end and the first arm, the method further comprising the step, carried out prior to the step of claim 3 and prior to the third step of claim 1, of lifting a third object with a looped end so that its loop is above the space, and moving a third object with a looped end to a position to the right of the second arm.

5. The method of claim 3, wherein a third object with a looped end is linked to the apparatus to the left of the first arm by a loop thereof, a loop of a third object with a looped end lying between a loop of a second object with a looped end and the first arm, the method further comprising the step, carried out prior to the third step of claim 1, of lifting a second and third object with a looped end so that their loops are above the space, and moving a second and third object with a looped end to a position to the right of the second arm.

\* \* \* \* \*